US008387003B2

(12) United States Patent
Darcy

(10) Patent No.: US 8,387,003 B2
(45) Date of Patent: Feb. 26, 2013

(54) PLUPERFECT HASHING

(75) Inventor: Joseph D. Darcy, Mountain View, CA (US)

(73) Assignee: Oracle America, Inc., Redwood City, CA (US)

( * ) Notice: Subject to any disclaimer, the term of this patent is extended or adjusted under 35 U.S.C. 154(b) by 752 days.

(21) Appl. No.: 12/606,917

(22) Filed: Oct. 27, 2009

(65) Prior Publication Data

US 2011/0099175 A1    Apr. 28, 2011

(51) Int. Cl.
*G06F 9/44*    (2006.01)
(52) U.S. Cl. ...................................... 717/106
(58) Field of Classification Search ................ 717/106
See application file for complete search history.

(56) References Cited

U.S. PATENT DOCUMENTS

| | | | | |
|---|---|---|---|---|
| 5,339,420 | A | 8/1994 | Hoxey | |
| 5,860,070 | A * | 1/1999 | Tow et al. | 707/704 |
| 6,076,141 | A | 6/2000 | Tremblay et al. | |
| 6,434,662 | B1 * | 8/2002 | Greene et al. | 711/216 |
| 6,775,763 | B2 | 8/2004 | Sexton et al. | |
| 7,047,230 | B2 * | 5/2006 | Gibbons | 717/141 |
| 7,142,669 | B2 * | 11/2006 | Dworkin et al. | 380/28 |
| 7,574,490 | B2 * | 8/2009 | Smith | 709/220 |
| 7,743,200 | B1 * | 6/2010 | Panwar et al. | 711/216 |
| 7,831,908 | B2 * | 11/2010 | Danilo | 715/245 |
| 7,856,653 | B2 * | 12/2010 | Berger et al. | 717/126 |
| 7,933,905 | B2 * | 4/2011 | Obana et al. | 711/216 |
| 7,982,636 | B2 * | 7/2011 | Abali et al. | 341/51 |
| 8,176,100 | B2 * | 5/2012 | Onodera et al. | 707/819 |
| 2004/0250235 | A1 * | 12/2004 | Liu et al. | 717/101 |
| 2007/0150857 | A1 * | 6/2007 | Korkishko et al. | 717/106 |
| 2007/0245119 | A1 * | 10/2007 | Hoppe | 711/216 |

OTHER PUBLICATIONS

Falkowski et al., "Calculation of Arithmetic Spectra from Free Binary Decision Diagrams"; Jun. 9-12, 1997; IEEE.*
Minato, "Zero-Suppressed BDDs for Set Manipulation in Combinatorial Problems"; 1993; ACM.*
Zhu et al., "Symbolic Pointer Analysis Revisited"; Jun. 9-14, 2004; ACM.*
Cao et al., "Flow Identification for Supporting Per-Flow Queueing", 2000, IEEE.*
Talbot et al., "Randomized Language Models via Perfect Hash Functions", Jun. 2008, ACL.*
Pus et al., "Fast and Scalable Packet Classification Using Perfect Hash Functions", Feb. 22-24, 2009, ACM.*
Fox et al., "Order-Preserving Minimal Perfect Hash Functions and Information Retrieval", 1991, ACM.*
Knuth, Donald E., "A Draft of Section 7.1.4: Binary Decision Diagrams" The Art of Computer Programming, vol. 4, Pre-Fascicle 1B, Addison-Wesley, Dec. 22, 2008.

* cited by examiner

*Primary Examiner* — Wei Zhen
*Assistant Examiner* — Junchun Wu
(74) *Attorney, Agent, or Firm* — Marsh Fischmann & Breyfogle, LLP; Danielle K. Morrow; Bobby Soltani

(57) ABSTRACT

Various embodiments herein include one or more of systems, methods, software, and/or data structures to implement a "pluperfect" hash function. Generally, a pluperfect hash function is a hash function that maps distinct elements in a set S to distinct hash values H with no collisions (i.e., perfect hash function) and also includes an additional constraint that the hash function does not map other elements outside the set S into the set of distinct hash values H. In some example embodiments, pluperfect hash functions are used to implement a multi-way branch statement in a computer programming language. The implementation may include generating hash values for each of the case labels of the branch statement according to a pluperfect hash function.

19 Claims, 9 Drawing Sheets

| INPUT STRING | HASH | b24 | b23 | b22 | b21 | b20 | b19 | b18 | b17 | b16 | b15 | b14 | b13 | b12 | b11 | b10 | b9 | b8 | b7 | b6 | b5 | b4 | b3 | b2 | b1 | b0 |
|---|---|---|---|---|---|---|---|---|---|---|---|---|---|---|---|---|---|---|---|---|---|---|---|---|---|---|
| "alabama" | 5312790 | 0 | 0 | 1 | 0 | 1 | 0 | 0 | 0 | 1 | 0 | 0 | 0 | 1 | 0 | 0 | 0 | 1 | 0 | 0 | 0 | 1 | 0 | 1 | 1 | 0 |
| "alaska" | 559254 | 0 | 0 | 0 | 0 | 0 | 1 | 0 | 0 | 0 | 1 | 0 | 0 | 0 | 1 | 0 | 0 | 0 | 1 | 0 | 0 | 1 | 0 | 1 | 1 | 0 |
| "arizona" | 5382698 | 0 | 0 | 1 | 0 | 1 | 0 | 0 | 1 | 0 | 0 | 0 | 1 | 0 | 0 | 0 | 1 | 0 | 0 | 0 | 1 | 0 | 1 | 0 | 1 | 0 |
| "arkansas" | 27542602 | 1 | 1 | 0 | 1 | 0 | 0 | 1 | 0 | 0 | 0 | 1 | 0 | 0 | 0 | 1 | 0 | 0 | 0 | 1 | 0 | 0 | 1 | 0 | 1 | 0 |
| "alamo" | 23 | 0 | 0 | 0 | 0 | 0 | 0 | 0 | 0 | 0 | 0 | 0 | 0 | 0 | 0 | 0 | 0 | 0 | 0 | 0 | 0 | 1 | 0 | 1 | 1 | 1 |
| "idaho" | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 |

BIT POSITION

FIG.9

PLUPERFECT HASHING

BACKGROUND

A hash function is generally a procedure or mathematical function which maps a large, possibly variable-sized amount of data into a small datum, usually a single integer that may serve as an index to an array. The values returned by a hash function are called hash values, hash codes, hash sums, or simply hashes. Hash functions are mostly used to speed up table lookup or data comparison tasks, such as finding items in a database, detecting duplicated or similar records in a large file, finding similar stretches in DNA sequences, and so on.

Typically, a hash function may map two or more keys to the same hash value. In many applications, it is desirable to minimize the occurrence of such collisions, which means that the hash function should map the keys to the hash values as evenly as possible. In some applications, there is a distinguished set of inputs that are fixed or slowly varying, such as keywords in a programming language or the names of US states. As can be appreciated, collisions generally increase the average lookup cost due to the time required to resolve the collisions. In those applications with fixed or slowing varying input, reducing collisions on the distinguished set of inputs can be especially beneficial given the expected frequency of occurrence of those inputs. Depending on the application, other properties may be required as well including low cost, determinism, uniformity, compactness, or other properties.

A hash function that is injective over a distinguished set, that is, one that maps each element of the distinguished set to a different hash value, is said to be "perfect." That is, a perfect hash function for a set S is a hash function that maps distinct elements in S to distinct hash values, such as distinct integers, with no collisions. A perfect hash function with values in a limited range may be used for efficient lookup operations by placing keys from S (or other associated values) in a table indexed by the output of the function As noted above, hash functions may have uses in a variety of table lookup operations. For illustration purposes, a particular application for utilizing hash functions is described herein which involves a construct of programming languages. Many computer programming languages include a language construct that may be viewed as a multi-way branch in which the value of a run-time variable or expression may be compared with members of a set of constants. A branch selection is made based on the result of the comparisons. Such constructs are often known as "switch statements." The description below provides an introduction and background information on these switch statements.

In typical switch statements, the run-time variable or expression, sometimes referred to as the "control variable" or "input control variable," may be tested against a set of case labels (or "case values"). If the value of the control variable matches a case label, the program will execute a block of code associated with that case label. If the value of the control variable does not match that case label, the next case label may be examined, and the process repeats until a match is found or until the given set of case labels is exhausted. In some languages, a "default" case label may be used to handle situations where the control variable does not match any of the case labels. Further, the method of terminating a block of code associated with a case label may vary by programming languages. Typically, a "break" keyword is used to signal the end of a block, thereby causing the program execution to exit the multi-branch construct. If no "break" keyword is present at the end of a block of code, in many languages the program execution "falls through" to the code associated with the next case label in the construct, as if its value also matched the control variable. In other languages, "fall throughs" are not permitted and a "break" keyword is implicit and does not need to appear in the source code.

One example programming language that includes the aforementioned multi-way branches is the Java programming language. The keyword used in Java for this type of function is "switch." To provide a context for the features presented herein, an example of the use of the "switch" statement available in the Java programming language is described below.

A Java switch statement works with data types including the byte, short, char, and int primitive data types. The switch statement also works with enumerated types and a few special classes that "wrap" certain primitive types. The following example program declares an integer variable named "month" whose value represents a month of the year. The program assigns the name of the month to a string variable "str" based on the value of the integer variable "month", using a switch statement as follows:

```
int month = 8;
String str;
switch (month) {
    case 1: str = "January"; break;
    case 2: str = "February"; break;
    case 3: str = "March"; break;
    case 4: str = "April"; break;
    case 5: str = "May"; break;
    case 6: str = "June"; break;
    case 7: str = "July"; break;
    case 8: str = "August"; break;
    case 9: str = "September"; break;
    case 10: str = "October"; break;
    case 11: str = "November"; break;
    case 12: str = "December"; break;
    default: str = "Invalid month.";break;
}
```

In this case, the variable str is set to "August" since the integer "month" is set to equal 8.

The switch statement above could also be implemented with if-then-else statements:

```
int month = 8;
String str;
if (month == 1) {
    str = "January";
} else if (month == 2) {
    str = "February";
}
... // and so on
```

Deciding whether to use if-then-else statements or a switch statement may be based on several factors, including readability, compile time requirements, execution time requirements, memory requirements, or other factors. It is noted that if-then-else statements and switch statements may be expressed in terms of one another. Generally, the if-then-else construct is more powerful since it may be used to compare multiple variables at once and compare a variable against a range of values. However, a switch construct is more readable when only one variable is being compared against a restricted set of values.

As noted above, the break statements are used because without them, case statements fall through. That is, without an explicit break, control of the program will flow sequentially through subsequent case statements. The following program illustrates why it might be useful to have case statements fall through:

```
int month = 2;
int year = 2000;
int numDays = 0;
switch (month) {
    case 1:
    case 3:
    case 5:
    case 7:
    case 8:
    case 10:
    case 12:
        numDays = 31;
        break;
    case 4:
    case 6:
    case 9:
    case 11:
        numDays = 30;
        break;
    case 2:
        numDays = ((year % 4 == 0) && !(year % 100 == 0)) || (year
        %400 == 0)) ?
29 : 28;
        break;
    default:
        numDays = -1;
        break;
}
```

In this example, since the integer variable "month" is set to 2 and the integer variable "year" is set to 2000, the variable numDays is assigned to 29.

If the range of case labels is relatively small and has only a few gaps (i.e., the case labels form a dense set), compilers may implement the switch statement as a branch table or an array of indexed function pointers rather than a lengthy series of conditional instructions. As can be appreciated, using such methods for case labels that form a sparse set could result in relatively inefficient programs.

SUMMARY

Various embodiments herein include one or more of systems, methods, software, and/or data structures to implement a "pluperfect" hash function. Generally, a pluperfect hash function is a hash function that maps distinct elements in a distinguished set S to distinct hash values H with no collisions (i.e., perfect hash function), and also includes an additional constraint that the hash function does not map other elements outside the set S into the set of distinct hash values H.

In one or more exemplary embodiments, a pluperfect hash function may be used to implement a multi-way branch statement (or "switch statement") in a computer programming language. The multi-way branch statement may include one or more case labels each having a non-primitive or "rich" data type (e.g., strings, arrays, large integer types, and the like) that are associated with a block of code to be executed dependent upon a control variable that also has a rich data type. The implementation may include encoding the case labels for the multi-way branch statement as a binary decision diagram (BDD), such as a zero-suppressed binary decision diagram (ZDD), such that a hash value for the control variable for the multi-way branch statement may be compared with hash values for the case labels using the BDD structure to generate the hash values.

According to a first aspect, a computer-implemented method is provided that may include receiving a set of input values from a data storage. The method may also include generating a "pluperfect" hash function for the set of input values. The hash function may be operative to map distinct input values in the set of input values to distinct hash values in a set of hash values. The hash function may further be operative to map all input values outside the set of input values to hash values outside the set of hash values. The method may also include determining a hash value for each of the input values in the set of input values using the hash function.

According to a second aspect, a computer system is provided which includes a processor and a data storage coupled to the processor. The data storage may store a pluperfect hash function module that is operative to be executed by the processor to receive a set of input values. The hash function module may further be operative to be executed by the processor to generate a hash function for the set of input values. The hash function may be operative to map distinct input values in the set of input values to distinct hash values in a set of hash values. The hash function may further be operative to map all input values outside the set of input values to hash values outside the set of hash values. The hash function module may further be operative to be executed by the processor to determine a hash value for each of the input values in the set of input values according to the hash function. In addition, the hash function module may be operative to be executed by the processor to store the hash values for each of the input values in the set of input values in a data storage.

According to a third aspect, a computer readable medium is provided that includes instructions which when processed by a computer, cause the computer to receive an input value. The computer readable medium also includes instructions which when processed by a computer, cause the computer to determine a hash value for the input value according to a hash function. The hash function may be operative to map distinct input values in a set of input values to distinct hash values in a set of hash values. The hash function may further be operative to map all input values outside the set of input values to hash values outside the set of hash values. Additionally, the computer readable medium may also include instructions which when processed by a computer, cause the computer to compare the hash value for the input value to hash values previously determined for the set of input values according to the hash function.

In addition to the exemplary aspects and embodiments described above, further aspects and embodiments will become apparent by reference to the drawings and by study of the following descriptions.

BRIEF DESCRIPTION OF THE DRAWINGS

FIG. 9 illustrates a table of the string case labels for the switch statement shown in FIG. 2 and their associated hash values generated using the BDD shown in FIG. 8.

DETAILED DESCRIPTION

Various embodiments herein include one or more of systems, methods, software, and/or data structures to implement a "pluperfect" hash function. Generally, a pluperfect hash function is a hash function that maps distinct elements in a set S to distinct hash values H with no collisions (i.e., perfect hash function) and includes an additional constraint that the hash function does not map other elements outside the set S into the set of distinct hash values H. As can be appreciated, pluperfect hash functions may be advantageous in several different applications.

Figure 10:
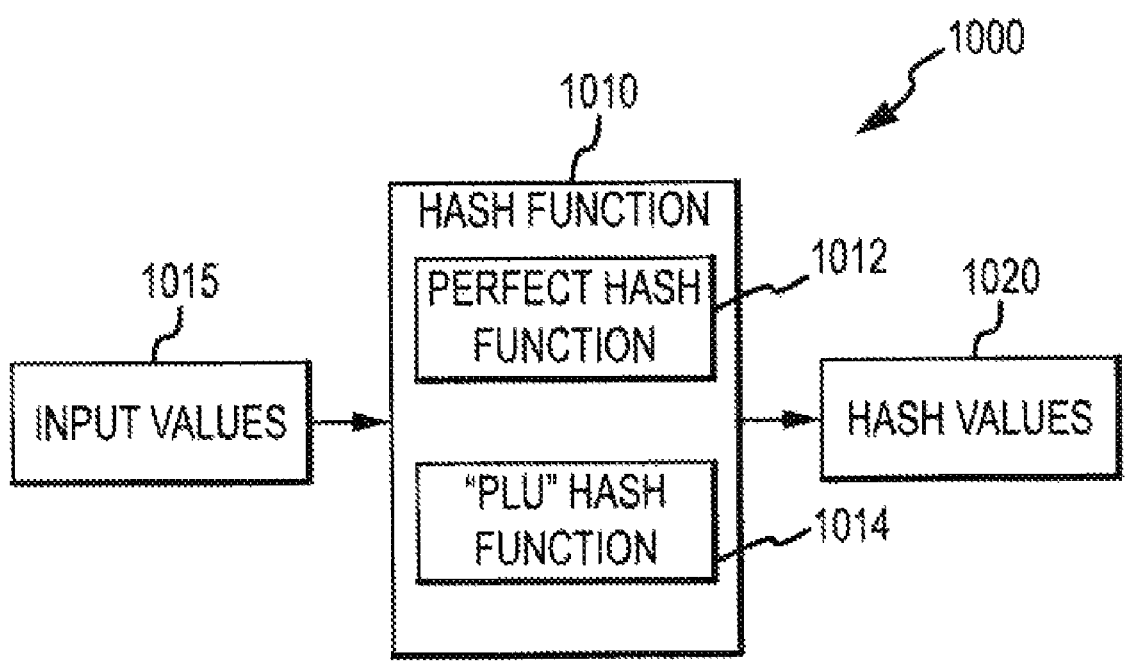
FIG. 10 illustrates a block diagram of a system for implementing a pluperfect hash function.
Figure 11:
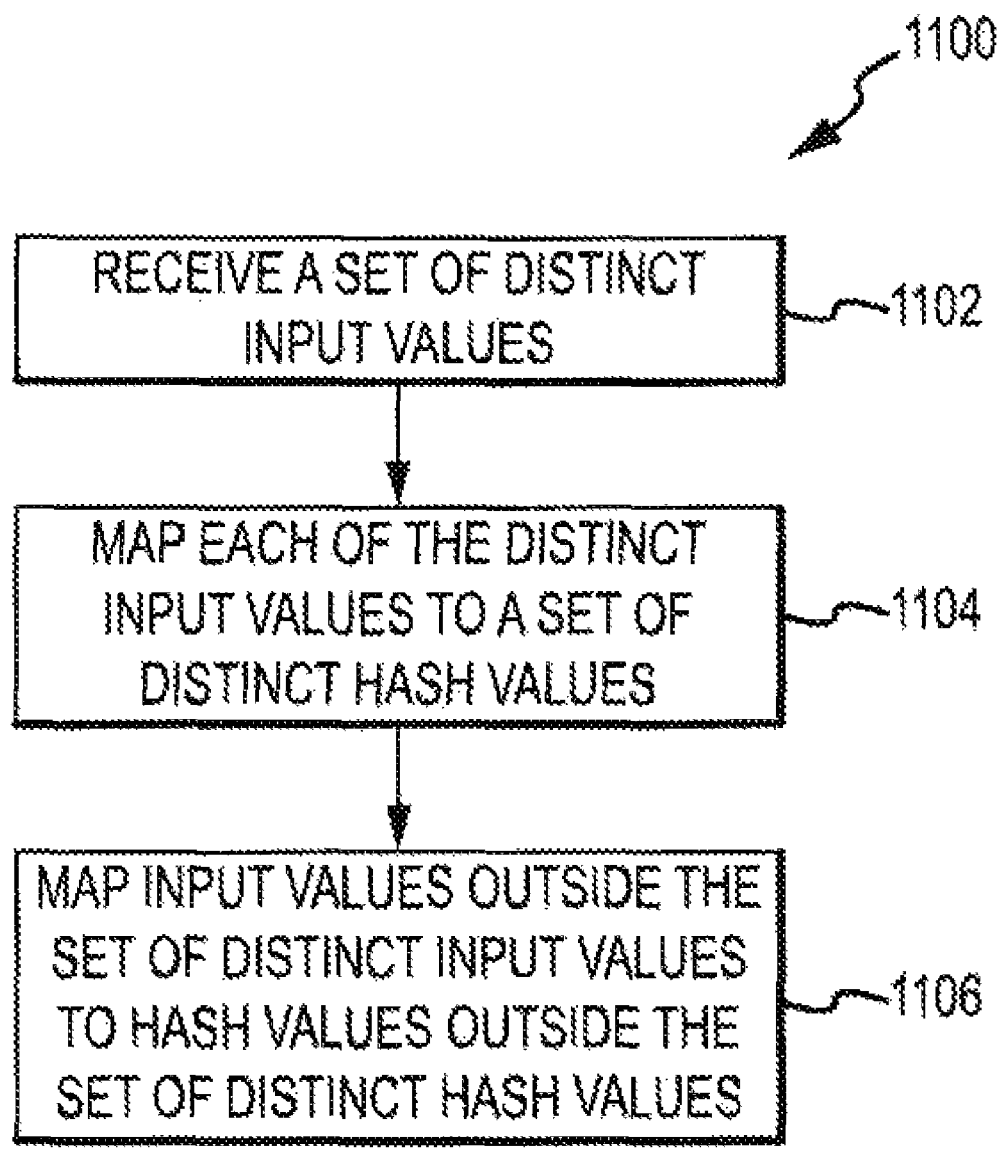
FIG. 11 illustrates a process for implementing a pluperfect hash function.

In the following discussion, systems and methods for providing pluperfect hash functions are explored. First, with reference to FIG. 1, an overview is provided of the characteristics of pluperfect hash functions. Next, with reference to FIGS. 2-9, particular embodiments of systems and methods for providing switch statements that are operative to switch on non-primitive data types using pluperfect hash functions are described. These embodiments are provided to illustrate and describe various applications in which pluperfect hash functions may be utilized. In addition, FIGS. 10-11 illustrate further embodiments for implementing pluperfect hash functions. Finally, with reference to FIG. 12, an exemplary computer system that may implement the systems and methods described herein is discussed.

Figure 1:
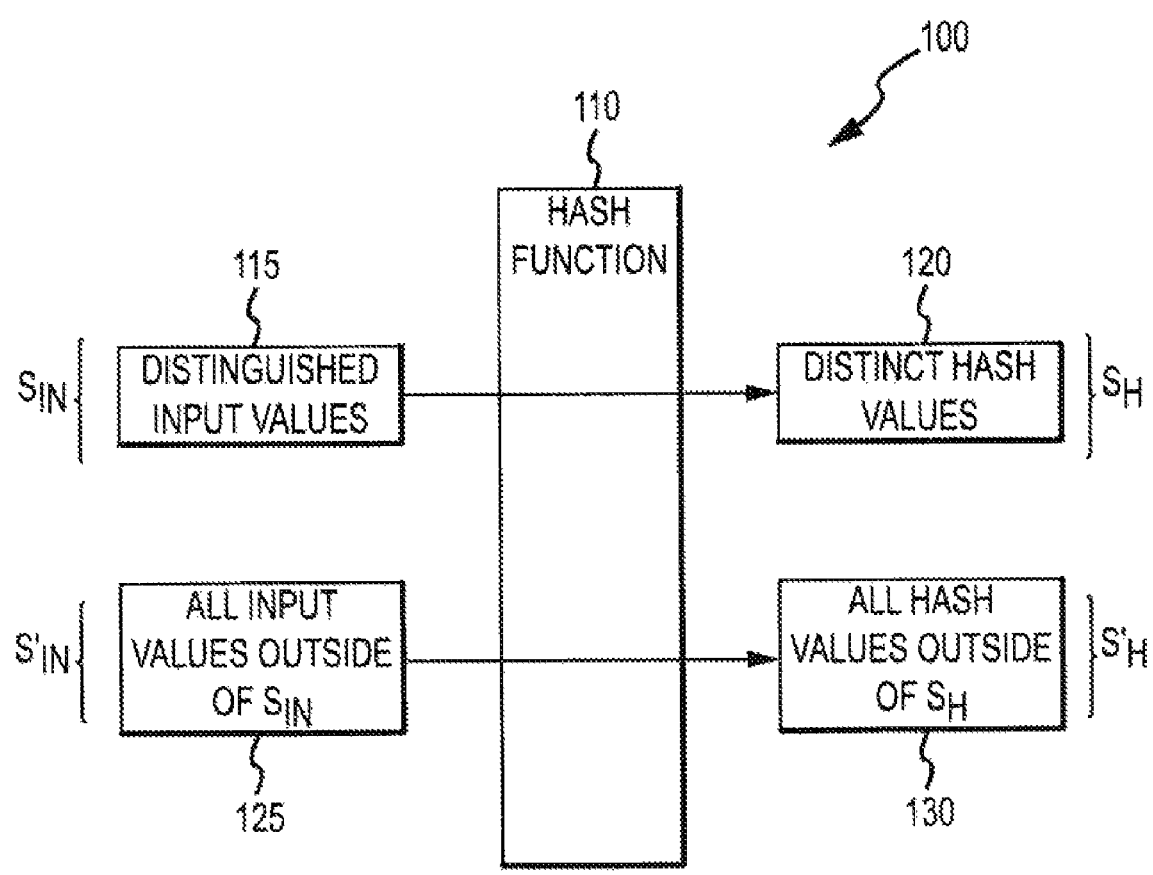
FIG. 1 illustrates an exemplary pluperfect hash function.
Figure 12:
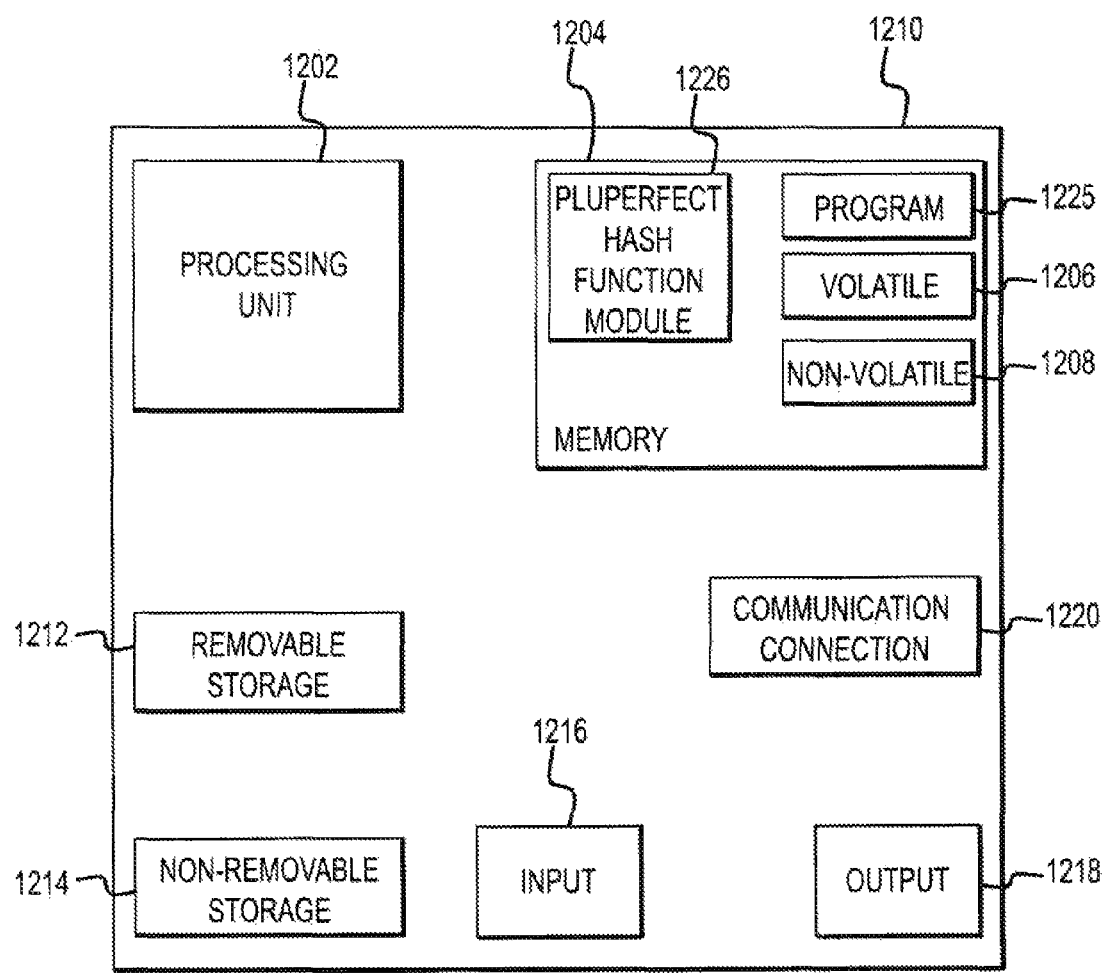
FIG. 12 illustrates a block diagram of an exemplary computer system according to one embodiment.

FIG. 1 illustrates a block diagram 100 of an exemplary pluperfect hash function 110 that may be implemented in a computer system, such as the computer system 1210 shown in FIG. 12. As can be seen, the pluperfect hash function 110 is a hash function that maps distinct input values in a set $S_{IN}$ 115 to distinct hash values in a set $S_H$ 120 with no collisions (i.e., perfect hash function). Further, the hash function 110 maps elements of a set $S'_{IN}$ 125 that are outside the set $S_{IN}$ 115 to hash values in a set of hash values $S'_H$ 130 that are outside the set of distinct hash values $S_H$.

More precisely, suppose a set S is a set of elements of interest (e.g., strings or other elements) and "s" is a particular element in the set S. The set S is a small subset of the universe of possible elements, $U_S$ (i.e., the universe out of which S comes from). The pluperfect hash function 110, or hash(s), maps a value s to another value h, or h=hash(s), where h may be some domain different from s, such as integers of a particular size. A set H is the union of all hash images of member of s, or H={h|h=hash(s) for some element s of set S}. The set H is a subset from some larger universe $U_H$. For the pluperfect hash function 110, |S|=|H|. That is, the cardinality of S (i.e., its size) is equal to the cardinality of H. Further, for all x elements $U_S\backslash S$ (i.e., all elements x which are a member of the set difference of the universe of S and S), hash(s) is an element of $U_H\backslash H$.

As can be appreciated, the properties of the pluperfect hash function 110 may be advantageous in several applications. For example, certain information is known based on the value of a pluperfect hash value. First, since the pluperfect hash function 110 maps distinct input values into distinct hash values, a pluperfect hash value uniquely identifies which input value in a set of input values S is identified by the hash value. That is, since there are no collisions with hash values from the elements of the distinguished set of interest, if an element's hash value matches the hash value of an element of the distinguished set, there is no need to further check that element for equality with the element from the distinguished set. When using a perfect hash function that is not also a pluperfect hash function, while the elements of the chosen set do no collide with each other, elements outside of the distinguished set can in general collide with members of the distinguished set. Therefore, additional equality checks are needed in that case of determine if an element really is a member of the distinguished set. Further, since the pluperfect hash function 110 maps all elements that are not equal to the distinct input values in the set S to other hash values outside the set of distinct hash values H, it is not necessary to insure that a particular input value matches the distinct input value in the set S pointed to by the hash value. That is, once it is determined that two hash values in H match each other, there is no need to check for "equality" between the two values (e.g., strings or other data type values), which may be a resource consuming operation. In certain applications, these features may improve system performance, reduce memory or computational requirements, or provide other advantages.

One example of a technique that may be used to implement a pluperfect hash function for strings of characters may be to concatenate the encoded values for each character in a string together. For example, for characters that are encoded as ASCII values, the code values for the characters 'd', 'o', and 'g' in the string "dog" are 100, 111, and 103, respectively. By concatenating these values together to form a hash value, a hash function having "pluperfect" qualities may be generated for strings. Other examples of pluperfect hash functions are described below.

FIGS. 2-9 illustrate embodiments for implementing a switch statement in a programming language using pluperfect hash functions. As noted above, these embodiments are included to demonstrate the utility of pluperfect hash functions. As such, these embodiments should be seen as example applications for pluperfect hash functions, and not limiting ones. Switching (or branching) program flow dependent on the run-time value of a control variable or expression is a useful, general-purpose operation found in many programming languages. It may be more compact than a series of conditional statements (e.g., if ... then ... else ... else ... end if) and easier to read. For improved memory and execution optimization, multi-way branch statements (or "switch statements") are often compiled by a compiler to special-purpose machine instructions (or virtual machine instructions) that are based on table looks ups. For case labels of a switch statement that form a relatively dense set (e.g., a set of consecutive or similar integers), table lookup operations are relatively fast and utilize a relatively small amount of memory. However, as can be appreciated, case labels that are of a non-primitive data type such as strings may form relatively sparse sets. That is, the values of the non-primitive data type case labels actually used are relatively small compared to the possible values for the case labels. As an example, a particular switch statement may include tens or hundreds of unique case labels out of the millions or even billions of case labels that are possible. For this and other reasons, many computer programming languages do not permit case labels having a non-primitive data type in switch statements, even though this feature would be desirable in many applications.

To provide functionality for implementing switch statements that permit non-primitive data types as case labels, present embodiments described herein advantageously encode the case labels for switch statements as a binary decision diagram (BDD), such as a zero-suppressed binary decision diagram (ZDD), wherein a hash function for the case labels may be generated using the BDD. Utilizing a BDD data structure to generate a hash function may allow for efficient switching on non-primitive data types using primitive data type switch statements by significantly reducing the computation required at run-time. The particulars of the features of this embodiment are described in further detail below.

Figure 2:
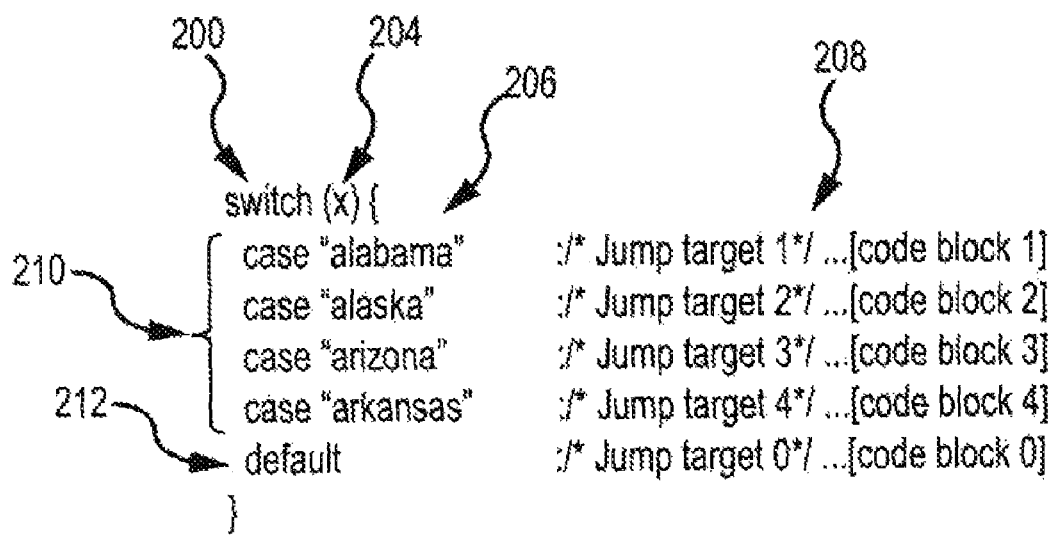
FIG. 2 illustrates an exemplary multi-way branch statement that includes string case labels.

FIG. 2 illustrates an exemplary switch statement 200 that permits string case labels. These types of switch statements may generally be referred to herein as "string switch statements." Although the switch statement 200 is written in a format for the Java programming language, it should be appreciated that this format is provided as an example and that other programming languages may be used as well. Further, as noted above, the systems and methods described herein may be used with non-primitive data types other than strings. Such other non-primitive data types may include lists, records, arrays, large integer types, custom data types and others. Generally, the features presented herein may be used with any data type for which an invertible function may be created between values in the data type and strings.

In the example shown in FIG. 2, the switch statement 200 includes four "case" keywords 210 followed by four string case labels 206 (i.e., "alabama", "alaska", "arizona", and "arkansas"). Next to each case label 206 is a code block 208 (i.e., code blocks 0-4) that represents computer program code that is to be executed when a control variable 204 matches its associated case label 206. For example, during run-time, if a string control variable 204 is determined to be equal to the case label "arizona," the code block 3 will be executed. The comments shown in FIG. 2 illustrate that each of the case labels 206 may be associated with a particular jump target 0-4 (or address or other identifier) in the program code to be executed when a control variable 204 matches a particular case label 206. The switch statement 200 also includes a "default" keyword 212 that may be used to execute code block 0 when the control variable 204 does not match any of the case labels 206.

Figure 3:
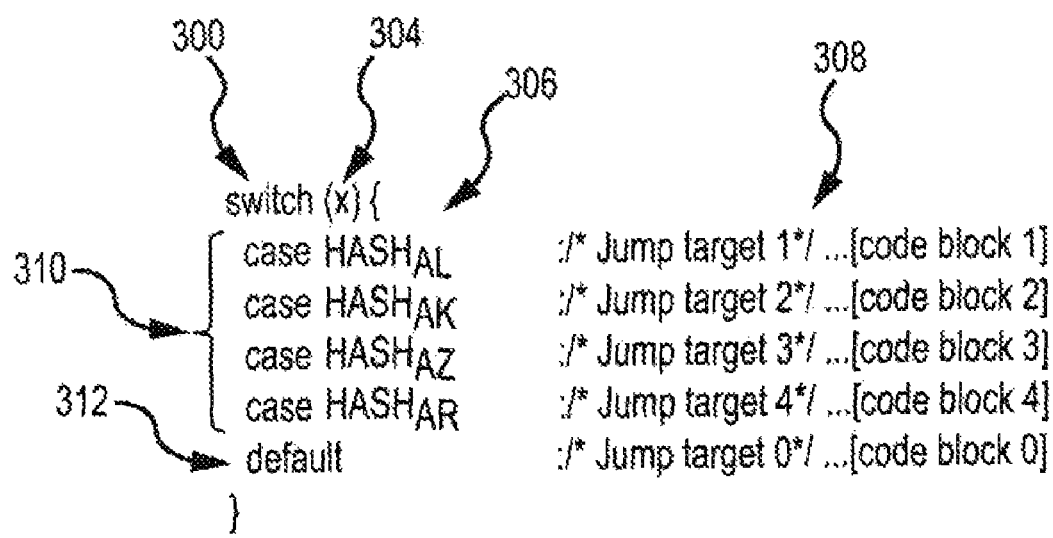
FIG. 3 illustrates an exemplary multi-way branch statement that includes integer case labels that are pluperfect hash values.

FIG. 3 illustrates an integer switch statement 300 that may be used to implement the string switch statement 200 shown in FIG. 2. As noted above, integer switch statements are common in programming languages and have well developed compilation strategies. Similar to the switch statement 200, the integer switch statement 300 includes the four "case" keywords 310. However, instead of the string case labels, the switch statement 300 includes integer case labels 306 (i.e., $HASH_{AL}$, $HASH_{AK}$, $HASH_{AZ}$, and $HASH_{AR}$) which are pluperfect hash values computed according to a pluperfect hash function. Next to each integer case label 306 is a code block 308 (i.e., code blocks 0-4) that represents computer program code that is to be executed when an integer control variable 304 matches its associated case label 306. During run-time, a hash value for an input string may be computed using the pluperfect hash function and then compared to the integer case labels 306. For example, if a hash value 304 for an input string control variable is determined to be equal to $HASH_{AK}$, the code block 2 will be executed at run-time. Similar to the switch statement 200, the switch statement 300 also includes a "default" keyword 312 that may be used to execute code block 0 when a hash value 304 for the control variable does not match any of the integer case labels 306.

Figure 4:
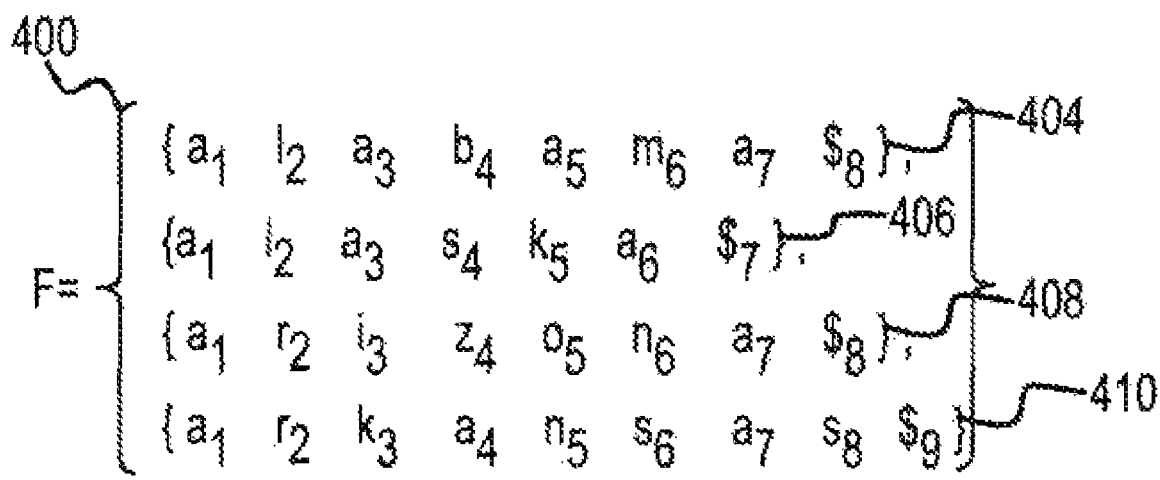
FIG. 4 illustrates a family of sets that may be used to form a binary decision diagram (BDD) to generate a pluperfect hash function for the multi-way branch statement shown in FIG. 2.
Figure 5:
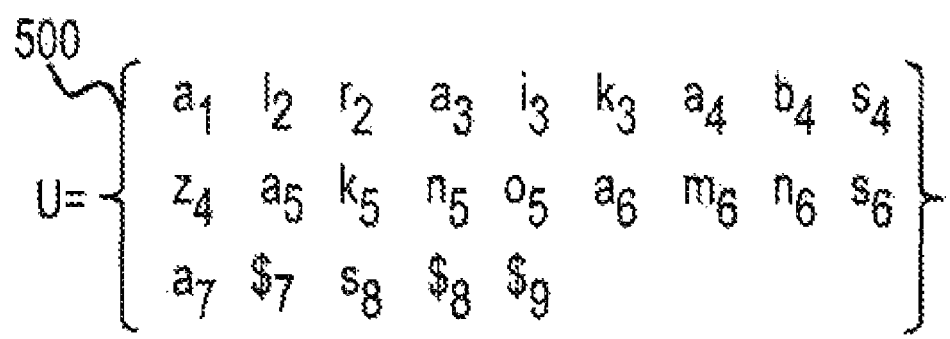
FIG. 5 illustrates a universe of elements that may be used to form a binary decision diagram (BDD) to generate a pluperfect hash function for the multi-way branch statement shown in FIG. 2.
Figures 6, 7:
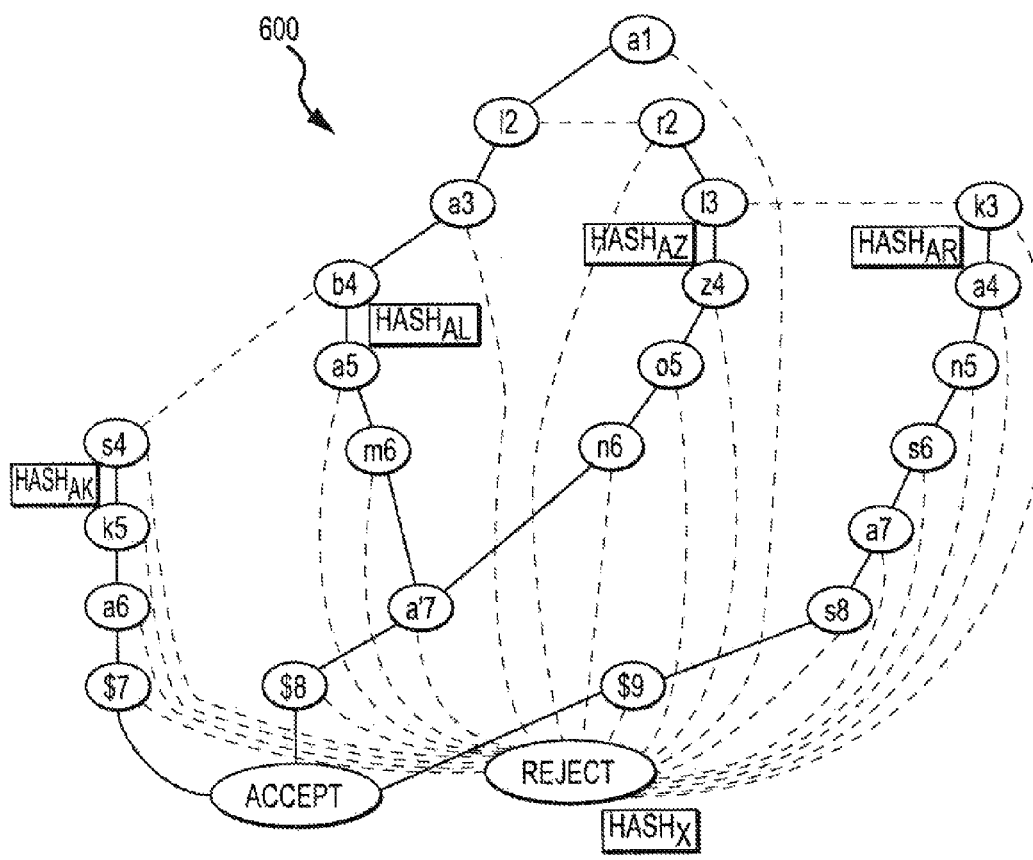
FIG. 6 illustrates an exemplary BDD that encodes the string case labels for the multi-way branch statement shown in FIG. 2.
FIG. 7 illustrates a table of the string case labels for the switch statement shown in FIG. 2 and their associated hash values.

FIGS. 4-6 are directed to illustrating a procedure for encoding the case labels 206 of the switch statement 200 shown in FIG. 2 as a binary decision diagram (BDD) to generate a pluperfect hash function. Generally, a binary decision diagram (BDD) is a data structure that is used to represent a Boolean function. At a more abstract level, BDDs may be considered as a compressed representation of sets or relations. A BDD represents a Boolean function as a rooted, directed, acyclic graph (DAG) that includes decision nodes and two terminal or leaf nodes called FALSE and TRUE (or 0-terminal and 1-terminal). Each decision node is labeled by a Boolean variable and has exactly two child nodes which may be referred to as low child and high child. The edge from a decision node to a low child represents an assignment of the variable to 0 and may be referred to as a negative or a LO edge. Similarly, the edge from a decision node to a high child represents an assignment of the variable to 1 and may be referred to as a positive or HI edge. A path from a root node to the 1-terminal represents a variable assignment for which the represented Boolean function is true, whereas a path from a root node to the 0-terminal represents a variable assignment for which the Boolean function is false.

When BDDs are applied to combinatorial problems, it may be observed that most of the positive edges of the decision nodes simply point to the 0-terminal. This may especially be true for matching strings or other non-primitive data types. In these cases, a zero-suppressed binary decision diagram (ZSDD, ZBDD, or ZDD) may perform better than a standard BDD. A ZDD is a type of BDD designed to encode sets of combinations or a family of sets of primitive elements. A ZDD is a rooted, directed, acyclic graph (DAG) that includes terminal and non-terminal nodes. Each of the non-terminal nodes is labeled with a variable and has two outgoing edges to child nodes referred to as a negative edge (or LO edge) and a positive edge (or HI edge). Similar to standard BDDs, ZDDs have two terminal or leaf nodes labeled FALSE and TRUE (or 0-terminal and 1-terminal) which do not have outgoing edges. Further, the universe of all variables (or primitive elements) is ordered, and the order of the variables appearing on the nodes of any path through the ZDD is consistent with the total order. Additionally, each path through the ZDD that ends at the TRUE terminal node defines a set of variables in the family of sets. In general, a set contains a variable if the path passes through a node of the ZDD labeled with the variable and leaves the node along its positive edge. Assuming that the variable ordering is fixed, the smallest ZDD representing a given family of sets is unique and can be determined efficiently using programming techniques.

FIG. 4 illustrates a family (F) 400 of sets 404, 406, 408, 410 created for encoding the string case labels 206 shown in FIG. 2 into a BDD data structure. It will be appreciated that although a BDD data structure is shown and described, the principles presented herein may apply to any variant of a BDD data structure, such as a ZDD. Each set 404, 406, 408, 410 represents characters for one of the case labels 206. For example, the set 404 includes the elements $a_1$, $l_2$, $a_3$, $b_4$, $a_5$, $m_6$, $a_7$, which correspond to the case label "alabama." Note that the elements also include a subscript number to identify their ordinal position in the case label (e.g., $b_4$ indicates that the letter b is the fourth letter in the case label "alabama"). Each set 404, 406, 408, 410 also include a sentinel character (i.e., $\$_8$, $\$_7$, $\$_8$, $\$_9$) appended after the element representing the last character in each associated case label 206. As described in more detail below, the sentinel characters are used to ensure that an input control variable 204 is not matched with a case label 206 if the control variable 204 is a superset of the case label 206 (e.g., the sentinel character ensures that "arizonas" is not matched with "arizona").

FIG. 5 illustrates a universe (U) 500 that is formed from the characters appearing in the case labels 206 for the switch statement 200 shown in FIG. 2. As can be appreciated, the elements in the universe (U) 500 may be used to create the family (F) 400 shown in FIG. 4.

FIG. 6 illustrates a graphical representation of a BDD 600 data structure that encodes the family (F) 400 of sets 404, 406, 408, 410 shown in FIG. 4, which correspond to the case labels 206 for the switch statement 200 shown in FIG. 2. The BDD 600 includes a root node $a_1$, which corresponds to the lowest value in the family (F) 400. In this example, the "value" of an element is given first by its ordinal position, and then alphabetically. For example, $z_4$ is smaller than $o_5$, and $a_3$ is smaller than $k_3$. The positive edges of each decision node are represented by solid lines, whereas the negative edges of each decision node are represented by dashed lines. In practice, the BDD 600 may be constructed from the root node $a_1$ down using recursive procedures.

As can be seen in FIG. 6, the path for each of the sets 404, 406, 408, 410 are encoded into the BDD 600 such that a set of elements compared (or "joined") against the BDD 600 having the identical elements as one of the sets 404, 406, 408, 410 will travel a path of the BDD 600 that ends at the ACCEPT (or TRUE) node, and sets of elements compared (or "joined") against the BDD 600 having elements different from all of the sets 404, 406, 408, 410 will travel a path of the BDD 600 that ends at the REJECT (or FALSE) node.

It is noted that the $a'_7$ decision node in the BDD 600 is a child of two decision nodes (i.e., $m_6$ and $n_6$). That is, the $a_7$ node for the "arizona" case label and the $a_7$ node for the "alabama" case label have been combined into the $a'_7$ node. This is possible because the two nodes would be identical (same label, same LOW child node, and the same HI child node) if they were implemented separately in the BDD 400. Further, the $a'_7$ decision node is used in addition to an $a_7$ decision node to differentiate between the two case labels that end with "a" as the seventh letter (i.e., "alabama", "arizona") and the case label that has an "a" as the seventh letter followed by another letter (i.e., "arkansas"). Further, as noted above, the sentinel character nodes $\$_7$, $\$_8$, and $\$_9$ are used to encode the end of string condition for each case label 206, so that a string control variable 204 is not matched with a case label 206 if the string control variable 204 is a superset of one of the case labels 206 (e.g., "arizona state" is not matched with "arizona"). To provide this functionality, a sentinel character is also added to the end of the input string control variable 204 that is compared with the BDD 600. It is noted that the sentinel characters need only be "logically" present. That is, the sentinel characters are used to represent "end of input" in the system. In this regard, the "$" symbol is meant to represent a value outside of the set of legal characters in a string. In other embodiments, the test for the presence of a "$" could include determining the length of a string, rather than checking for an actual "end of line" character.

As noted above, the BDD 600 may be used to determine whether a particular string matches one of the case labels 206 associated with the string statement 200. In this regard, joining a string against the BDD 600 may return an ACCEPT or REJECT, depending on whether there is a match. However, it is not enough to determine simply whether there is a match with any of the case labels 206. Rather, to implement a switch statement, it should be determined specifically which case label 206 has been matched. To accomplish this, the BDD 600 may include a plurality of integer pluperfect hash values (i.e., $HASH_{AL}$, $HASH_{AK}$, $HASH_{AZ}$, $HASH_{AR}$) located at points on the BDD that represent an exclusive match to a code block associated with a particular string case label 206. One property of a BDD is that it readily identifies the number of elements which potentially can be matched by a given interior node; this property allows identification of the nodes in the graph where possible matches are uniquely identified.

As shown, the pluperfect hash values are associated with positive edges of decision nodes that represent an exclusive match against a set in the family (F) 400, which indicates a possible match with one of the case labels 206. For example, the hash value $HASH_{AL}$ is positioned at the positive edge of the decision node $b_4$, because that location on the BDD 600 indicates that a string, if it is match for any case label 206, will have to be a match for the case label "alabama." To ensure that a particular string is a complete match and not simply a partial match (e.g., "alabamas" or "alaba"), the remainder of the control variable string should normally be matched against the BDD 600 until the ACCEPT or REJECT node is reached. Similarly, the hash value $HASH_{AK}$ is positioned at the positive edge of $s_4$ (i.e., representing a possible exclusive match for "alaska"), the hash value $HASH_{AZ}$ is positioned at the positive edge of $i_3$ (i.e., representing a possible exclusive match for "arizona"), and the hash value $HASH_{AR}$ is positioned at the positive edge of $k_3$ (i.e., representing a possible exclusive match for "arkansas"). Further, the hash value $HASH_X$ may be associated with the REJECT node, such that the code block associated with the "default" keyword of the switch statement 200 will be executed for input strings that do not match any of the case labels 206.

FIG. 7 illustrates a table 700 that includes a column of input strings 705 and their associated hash values 710. As noted above, input strings that match one of the case labels 206 will be assigned to a hash value for the matched case label, and all other input strings will be assigned to the hash value $HASH_X$. The value of $HASH_X$ may vary for different inputs as long as the value is not equal to any of the hash values assigned to inputs in the distinguished set. In practice, the string switch statement 200 may be compiled using an integer switch statement that includes the hash values 306 for the case labels 206. The hash values 306 may be a collection of dense contiguous integers or some other convenient set of values. Then, at run-time, a hash value for an input string may be computed and compared against the hash values 306 for the case labels 206. Next, an appropriate branch selection may be completed dependent on the outcome of the comparison. It is noted that, by utilizing a pluperfect hash function, it is only necessary to read in an input string once when the hash value is determined. That is, it is not necessary to compare the input string with a string case label 206 once a hash value 306 has been matched since the pluperfect features ensure that strings having the same hash value are identical. As can be appreciated, this feature may significantly improve the run-time performance of an application utilizing a pluperfect hash function.

Figure 8:
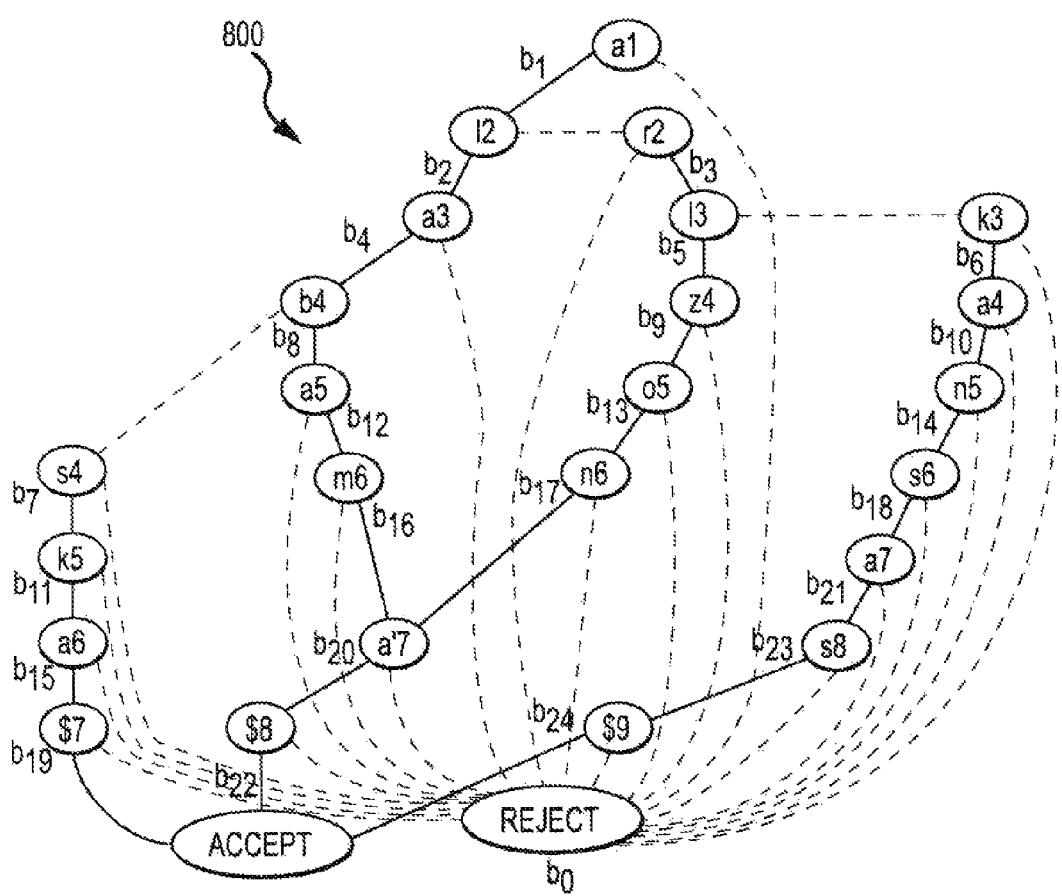
FIG. 8 illustrates an exemplary BDD that encodes the string case labels for the multi-way branch statement shown in FIG. 2 to generate a pluperfect hash function.

FIG. 8 illustrates another BDD 800 that may be used to generate a pluperfect hash function for the case labels 206 of the switch statement 200 shown in FIG. 2. In this embodiment, each pluperfect hash value is a 25 bit integer, wherein each bit represents a location or decision on the BDD 800. For example, bit $b_0$ of each hash value indicates that the REJECT node is traversed by a string joined against the BDD 800. The remainder of the bits (i.e., bits $b_{1-24}$) of each hash value indicates that a particular positive edge of a decision node is traversed by a string joined against the BDD 800. For example, a 1 at bit position $b_{16}$ indicates that the positive edge of the decision node m6 of the BDD 800 is traversed by the string represented by the hash value.

It will be appreciated that the encoding scheme shown in FIG. 8 generates a pluperfect hash function. That is, for every distinct case label of interest, a distinct hash value is generated. Further, for every input string not equal to any of the case labels of interest, a hash value different from the distinct hash values is generated. For example, since bit $b_0$ indicates that the REJECT node is traversed, it will only be set for strings that do not match any of the case labels 206. Further, since each of the distinct case labels traverse different paths of the BDD 800, each of their respective hash values will be distinct.

FIG. 9 illustrates a table 900 which shows various input strings 905 and their hash values 910 in decimal format generated from the BDD 800. Additionally, the value of each of the bit positions 915 for each hash value 910 is shown. The hash value for each of the input strings 905 may be determined by traversing the BDD 800, setting each bit position along the way. For example, for the input string "alaska," the bit positions $b_1$, $b_2$, $b_4$, $b_7$, $b_{11}$, $b_{15}$, and $b_{19}$ are traversed and therefore set to the value 1. The hash values for the other input strings 905 may similarly be determined using the BDD 800. As shown by the arrow 920, the bit $b_0$ is only set for input strings 905 that do not match the case labels 206, such as "alamo" and "idaho." Thus, by encoding various positions on the BDD 800 into a bit stream, a pluperfect hash function may be generated. It should be appreciated that the specific positions encoded in this example are chosen for explanatory purposes, and that other similar configurations are contemplated.

FIG. 10 illustrates a block diagram 1000 of a pluperfect hash function 1010 according to another embodiment. As in previously described examples, the pluperfect hash function may be operative to generate hash values 1020 for input values 1015 according to "pluperfect" constraints. That is, the pluperfect hash function 1010 maps distinct input values 1015 in a set S to a set of distinct hash values 1020 with no collisions and also includes an additional constraint that the hash function 1010 does not map other input values 1015 outside the set S into the set of distinct hash values 1020.

In this example, the pluperfect hash function 1010 includes a perfect hash function 1012 that is operative to map distinct input values 1015 in a set S to a set of distinct hash values 1020 with no collisions. The perfect hash function 1012 may be a hash function that is readily available, such as from gperf, cmph, or other commercially or freely available perfect hash function generator. Further, the pluperfect hash function 1010 includes a "plu" hash function 1014 that is operative to implement the additional constraint that other input values 1015 outside the set S are not mapped into the set of distinct hash values 1020. The plu function may be an identification function, returning one value for members of the set S and a single other value for values outside of S or, more generally, returning a single value for members of S and some other value, perhaps varying by element, for values outside of S.

The "plu" hash function 1014 may be implemented in any number of ways. In some embodiments, all input values of interest (i.e., in a set S) are mapped to a first value, and all input values not of interest (i.e., outside the set S) are mapped to a second value different from the first value. These embodiments may be illustrated by a simple example that includes three strings "aa", "ba", and "bb" as input values of interest. Using Java, a "plu" hash function for this set of input values may be:

```
int hash=(s.length( )==2)?0:1;
c0=s.charAt(0);
c1=s.charAt(1);
hash+=(abs('b'-c0)<=1)?0:1;
hash+=(((c1-c0)& 0xfffffffe)==0)?0:1;
```

This plu hash function sets the integer variable "hash" to 0 for the input values of interest (i.e., "aa", "ba", and "bb") and nonzero for all input values not equal to the input values of interest. It will be appreciated that other techniques may be used to combine a perfect hash function with a "plu" hash function to generate a pluperfect hash function.

FIG. 11 illustrates a process 1100 for generating a pluperfect hash function. The process 1100 may be implemented by modules (e.g., a compiler) executing on a computer system, such as the computer system 1210 shown in FIG. 12 and described below. The process 1100 may begin by receiving a set of distinct input values (step 1102). The input values may, for example, be of a non-primitive data type including lists, records, arrays, large integer types, custom data types, strings, and others. The process 1100 may also include mapping each of the distinct input values to a set of distinct hash values (step 1104) and mapping input values outside the set of distinct input values to hash values outside the set of distinct hash values (step 1106). The steps 1104 and 1106 may be implemented using one or more embodiments described herein above for providing pluperfect hash functions, or other techniques may be used to generate a hash function having "pluperfect" features.

FIG. 12 is a block diagram of a computer system 1210 that may be used to implement the various systems and methods described above. The example computer system 1210 in the form of a computer may include a processing unit 1202, memory 1204, removable storage 1212, and non-removable storage 1214. Memory 1204 may include volatile memory 1206 and non-volatile memory 1208. The computer system 1210 may include, or have access to a computing environment that includes, a variety of computer-readable media, such as volatile memory 1206 and non-volatile memory 1208, removable storage 1212 and non-removable storage 1214. Computer storage may include random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. The computer system 1210 may include, or have access to a computing environment that includes, input 1216, output 1218, and a communication connection 1220. The input 1216 may include one or more input devices such as a mouse, a keyboard, electronic pen type input, an audio input device such as a microphone coupled to an audio card or other dedicated audio circuit, a web cam, a screen capture program or device, or other input device. The output 1218 may include a video monitor, speakers coupled to the audio card or other dedicated audio circuit, a printing device, or other output device.

The computer system 1210 may operate in a networked environment using the communication connection 1220 to connect to one or more remote computers, such as one or more servers or other remote computers. The remote computers may include one or more of a personal computer ("PC"), notebook computer, consumer electronic device (e.g., camera, camcorder, set top box, mobile device, and the like), server, router, network PC, a peer device, or other common network node, and the like. The communication connection 1220 may include a Local Area Network ("LAN"), a Wide Area Network ("WAN"), the Internet, a Virtual Private Network ("VPN"), a peer-to-peer network, or other networks.

Computer-readable instructions stored on a computer-readable medium may be executable by the processing unit 1202 of the computer system 1210. A hard drive, CD-ROM, and RAM are some examples of articles including a computer-readable medium. For example, one or more computer programs (or application) 1225 may be stored in the memory 1204. The memory 1204 may also store a pluperfect hash function module 1226 that is operative to perform the functionality described herein above with reference to FIGS. 1-11. For example, the pluperfect hash function module 1226 may include a compiler. Further, one or more computer programs 1225 may be execute multi-way branch statements that include non-primitive data types as case labels and control variables using pluperfect hash functions and integer multi-way branch statements.

While this specification contains many specifics, these should not be construed as limitations on the scope of the disclosure or of what may be claimed, but rather as descriptions of features specific to particular embodiments of the disclosure. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and/or parallel processing may be advantageous. Moreover, the separation of various system components in the embodiments described above should not be understood as requiring such separation in all embodiments, and it should be understood that the described program components and systems can generally be integrated together in a single software and/or hardware product or packaged into multiple software and/or hardware products.

I claim:

1. A computer-implemented method comprising:
    receiving a distinguished set of input values from a data storage; generating a hash function for the distinguished set of input values, the hash function being operative to map distinct input values in the distinguished set of input values to distinct hash values in a set of hash values, and further operative to map all input values outside the distinguished set of input values to hash values outside the set of hash values, wherein each distinct input value is mapped to a distinct hash value; and using a processor, determining a hash value for each of the input values in the distinguished set of input values using the hash function, wherein the hash function includes a perfect hash function in combination with a second hash function, the second hash function being operative to map all input values included in the distinguished set of values to a first value, and further operative to map all input values outside the distinguished set of input values to one or more values different than the first value.

2. The method of claim 1, further comprising:
    receiving an input value;
    determining a hash value for the input value according to the hash function; and
    comparing the hash value for the input value to the hash values for the input values in the distinguished set of input values.

3. The method of claim 1, wherein each of the input values comprises a string of characters; and wherein each of the hash values is determined by:
    determining an encoded numeric value for each character in a string to provide a set of encoded numeric values; and
    concatenating the encoded numeric values together to form a hash value.

4. The method of claim 1, wherein the distinguished set of input values comprise input values that are of a non-primitive data type.

5. The method of claim 4, further comprising:
    implementing a multi-way branch statement by using the hash values for each of the input values as case labels for a multi-way branch statement that includes primitive data type case labels.

6. The method of claim 1, wherein each of the hash values is determined by:
    encoding the input values as a binary decision diagram (BDD) created from a family of sets;
    associating positions of the BDD with bit positions of the hash values such that the input values are encoded into unique hash values dependent on the path of the BDD traversed by a particular input value.

7. The method of claim 6, wherein the BDD is a zero-suppressed binary decision diagram (ZDD), and wherein the positions of the ZDD associated with bit positions of the hash values include positive edges of decision nodes of the ZDD.

8. The method of claim 1, wherein the generating step comprises encoding the input values as a binary decision diagram (BDD) created from a family of sets, and wherein the determining step comprises assigning a distinct hash value to each path of the BDD that exclusively encodes an input value.

9. A computer system comprising:
    a processor; and
    a data storage coupled to the processor, the data storage storing a hash function module that is operative to be executed by the processor to:
    receive a distinguished set of input values;
    generate a hash function for the distinguished set of input values, the hash function being operative to map distinct input values in the distinguished set of input values to distinct hash values in a set of hash values, and further operative to map all input values outside the distinguished set of input values to hash values outside the set of hash values;
    determine a hash value for each of the input values in the distinguished set of input values according to the hash function, wherein the hash function includes a perfect hash function in combination with a second hash function, the second hash function being operative to map all input values included in the distinguished set of values to a first value, and further operative to map all input values outside the distinguished set of input values to one or more values different than the first value; and
    store the hash values for each of the input values in the distinguished set of input values in a data storage.

10. The computer system of claim 9, wherein the hash function module is further operative to be executed by the processor to:
    receive an input value;
    determine a hash value for the input value according to the hash function; and
    compare the hash value for the input value to the hash values for the input values in the distinguished set of input values.

11. The method of claim 1, wherein each of the input values comprises a string of characters; and wherein each of the hash values is determined by:
  determining an encoded numeric value for each character in a string to provide a set of encoded numeric values; and
  concatenating the encoded numeric values together to form a hash value.

12. The computer system of claim 9, wherein the distinguished set of input values comprise input values that are of a non-primitive data type.

13. The computer system of claim 12, wherein the hash function module is further operative to be executed by the processor to:
  implement a multi-way branch statement by using the hash values for each of the input values as case labels for a multi-way branch statement that includes primitive data type case labels.

14. The computer system of claim 9, wherein the hash function module is further operative to be executed by the processor to determine each of the hash values by:
  encoding the input values as a binary decision diagram (BDD) created from a family of sets;
  associating positions of the BDD with bit positions of the hash values such that the input values are encoded into unique hash values dependent on the path of the BDD traversed by a particular case label.

15. The computer system of claim 9, wherein the hash function module is further operative to be executed by the processor to determine each of the hash values by:
  encoding the input values as a binary decision diagram (BDD) created from a family of sets; and
  assigning a distinct hash value to each path of the BDD that exclusively encodes an input value.

16. A computer readable medium including instructions which when processed by a computer, cause the computer to: receive an input value; determine a hash value for the input value according to a hash function, the hash function being operative to map distinct input values in a distinguished set of input values to distinct hash values in a set of hash values, and further operative to map all input values outside the distinguished set of input values to hash values outside the set of hash values; and compare the hash value for the input value to hash values previously determined for the distinguished set of input values according to the hash function, wherein the hash function includes a perfect hash function in combination with a second hash function, the second hash function being operative to map all input values included in the distinguished set of values to a first value, and further operative to map all input values outside the distinguished set of input values to one or more values different than the first value.

17. The computer readable medium of claim 16, wherein the distinguished set of input values comprise case labels for a multi-way branch statement, the case labels being of a non-primitive data type, and wherein the computer readable medium further includes instructions which when processed by a computer, cause the computer to:
  implement the multi-way branch statement by using the hash values for each of the input values as case labels for a multi-way branch statement that includes primitive data type case labels.

18. The computer readable medium of claim 16, wherein the computer readable medium further includes instructions which when processed by a computer, cause the computer to determine each of the hash values by:
  encoding the input values as a binary decision diagram (BDD) created from a family of sets;
  associating positions of the BDD with bit positions of the hash values such that the input values are encoded into unique hash values dependent on the path of the BDD traversed by a particular input value.

19. The computer readable medium of claim 16, wherein the computer readable medium further includes instructions which when processed by a computer, cause the computer to determine each of the hash values by:
  encoding the input values as a binary decision diagram (BDD) created from a family of sets; and
  assigning a distinct hash value to each path of the BDD that exclusively encodes an input value.

* * * * *